(12) United States Patent
Okita

(10) Patent No.: US 8,040,584 B2
(45) Date of Patent: Oct. 18, 2011

(54) LIGHT CONTROLLING APPARATUS

(75) Inventor: Tatsuhiko Okita, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/842,260

(22) Filed: Jul. 23, 2010

(65) Prior Publication Data

US 2011/0032592 A1   Feb. 10, 2011

(30) Foreign Application Priority Data

Aug. 4, 2009   (JP) ................................. 2009-181230

(51) Int. Cl.
*G02B 26/02* (2006.01)
(52) U.S. Cl. ....................................................... 359/234
(58) Field of Classification Search .................. 359/227, 359/233, 234
See application file for complete search history.

(56) References Cited

U.S. PATENT DOCUMENTS

| 7,573,629 | B2 * | 8/2009 | Bai ................................ | 359/234 |
| 2005/0052872 | A1 * | 3/2005 | de Peralta ...................... | 362/321 |
| 2008/0247025 | A1 * | 10/2008 | Jurik .............................. | 359/234 |

FOREIGN PATENT DOCUMENTS

JP   2002-296637   10/2002

* cited by examiner

*Primary Examiner* — Euncha Cherry
(74) *Attorney, Agent, or Firm* — Scully, Scott, Murphy & Presser, P.C.

(57) ABSTRACT

A light controlling apparatus includes a substrate in which an optical aperture is formed, a first light controlling means and a second light controlling means, each having an optical aperture regulating portion, and a drive source which operates the first light controlling means and the second light controlling means. The first light controlling means and the second light controlling means move mutually to a first stationary position retracted from a position of the optical aperture and a second stationary position which overlaps with the position of the optical aperture. A rotating shaft member is formed integrally with the first light controlling means. A coupling portion is formed on at least one of the first light controlling means and the second light controlling means, and the first light controlling means is rotated by rotating the rotating shaft member by the drive source, and the second light controlling means is also rotated in conjunction by the coupling portion. The first light controlling means and the second light controlling means rotate with the same axis of rotation as a center of rotation.

9 Claims, 12 Drawing Sheets

LIGHT CONTROLLING APPARATUS

CROSS-REFERENCE TO RELATED APPLICATION

The present application is based upon and claims the benefit of priority from the prior Japanese Patent Application No. 2009-181230 filed on Aug. 4, 2009; the entire contents of which are incorporated herein by reference.

BACKGROUND OF THE INVENTION

1. Field of the Invention

The present invention relates to a light controlling apparatus.

2. Description of the Related Art

In recent years, with improved high-quality performance of a portable equipment having an image pickup function and a small-size optical apparatus such as micro video scope, there has been increasing demand for an application of a focusing lens and a variable aperture instead of a conventional fixed focusing lens and a fixed aperture.

Further small-sizing has been sought in the optical elements as well. In Japanese Patent Application Laid-open Publication No. 2002-296637, a structure in which, a diaphragm blade is divided into two, and the two diaphragm blades are accommodated at a position upon being retracted from an optical aperture formed in a substrate, making it suitable for small-sizing has been proposed.

However, in the abovementioned conventional technology, the two diaphragm blades are driven simultaneously by one drive source. Each of the two diaphragm blades has a coupling section for coupling with a separate rotating shaft and a drive source, thereby making the structure complicated. Therefore, the assembling is extremely difficult.

SUMMARY OF THE INVENTION

The present invention is made in view of the abovementioned issues, and an object of the present invention is to provide a light controlling apparatus in which, it is possible to simplify the structure, to improve assemblability, and to realize further small-sizing.

To solve the abovementioned issues and to achieve the objective, according to the present invention, there is provided a light controlling apparatus including a substrate in which an optical aperture is formed, a first light controlling means and a second light controlling means, each having an optical aperture regulating portion, and a drive source which operates the first light controlling means and the second light controlling means, and the first light controlling means and the second light controlling means move mutually to a first stationary position retracted from a position of the optical aperture, and a second stationary position which overlaps with the position of the optical aperture, and a rotating shaft member is formed integrally with the first light controlling means, and a coupling portion is formed on at least one of the first light controlling means and the second light controlling means, and the first light controlling means is rotated by rotating the rotating shaft member by the drive source, and the second light controlling means is also rotated in conjunction by the coupling portion, and the first light controlling means and the second light controlling means rotate with the same axis of rotation as a center of rotation.

According to a preferable aspect of the present invention, it is desirable that a central axis of the rotating shaft member and the axis of rotation of the first controlling means and the second controlling means coincide.

According to a preferable aspect of the present invention, it is desirable that at least one of the first light controlling means and the second light controlling means has a protruding portion which is protruded in an optical axial direction, and the first light controlling means and the second light controlling means are coupled by the protruding portion, and move in conjunction.

According to a preferable aspect of the present invention, it is desirable that a groove is formed in one of the first light controlling means and the second light controlling means, and a protruding portion which is protruded in the optical axial direction is formed in one of the first light controlling means and the second light controlling means in which the groove is not formed, and the first light controlling means and the second light controlling means are coupled and operated by the groove and the protruding portion.

According to a preferable aspect of the present invention, it is desirable that the first light controlling means and the second light controlling means are accommodated in an overlapped state at the first stationary position, and an optical aperture is formed by the optical aperture regulating potion portion at the second stationary position.

According to a preferable aspect of the present invention, it is desirable that the rotating shaft member is formed by a circular cylindrical shaped magnet, and the drive source is an electromagnetic drive source which includes a yoke and a winding coil, and the circular cylindrical shaped magnet is rotated by the electromagnetic drive source.

DETAILED DESCRIPTION OF THE PREFERRED EMBODIMENTS

Exemplary embodiments of a light controlling apparatus according to the present invention will be described below in detail by referring to the accompanying diagrams. However, the present invention is not restricted by the embodiments described below.

First Embodiment

To start with, a light controlling apparatus according to a first embodiment will be described below. The first embodiment will be described by using diagrams from FIG. 1 to FIG. 5. Firstly, a structure of the first embodiment will be described below by using FIG. 1 and FIG. 2.

Figure 1:
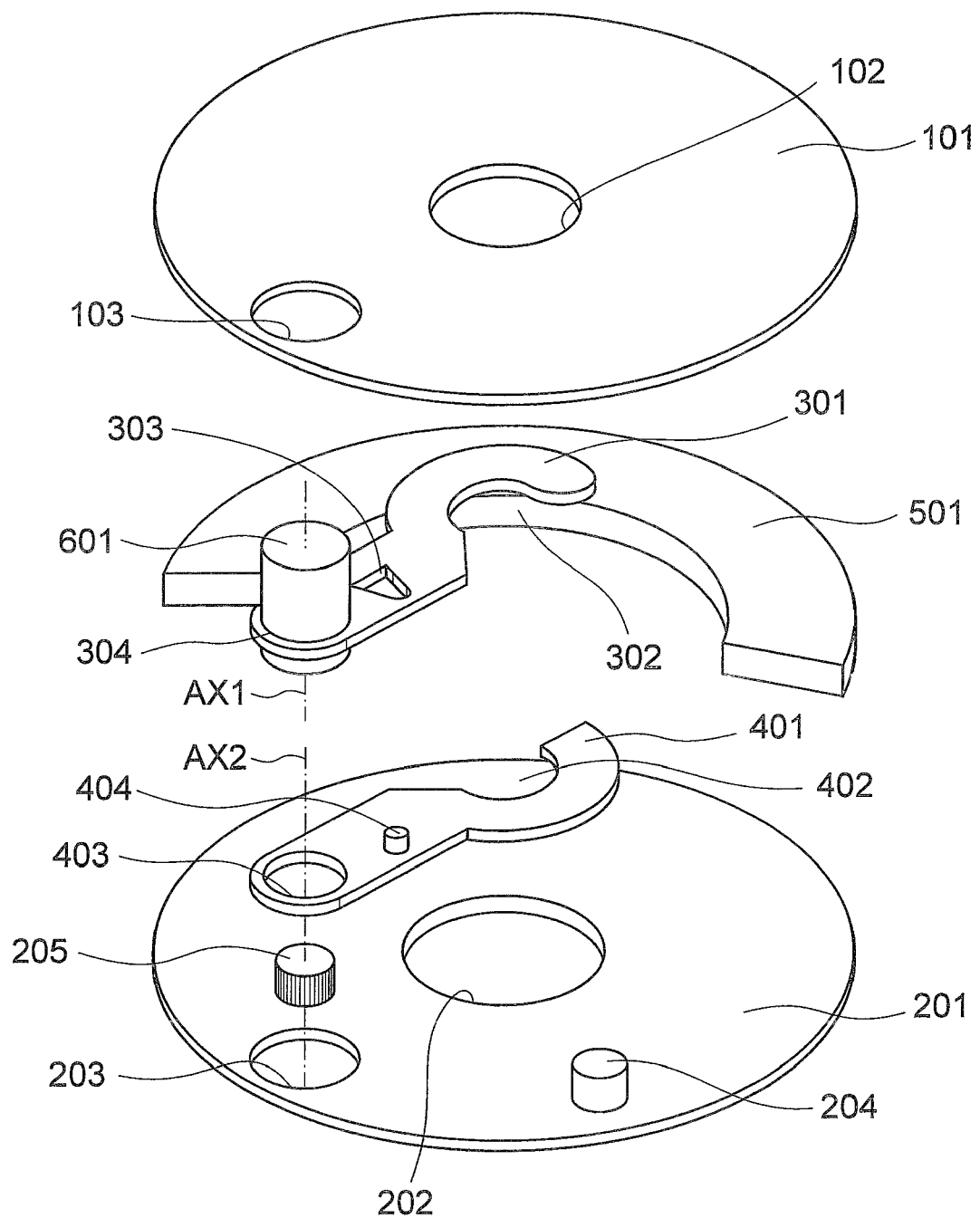
FIG. 1 is a diagram showing a structure of a first embodiment.

As shown in FIG. 1, the light controlling apparatus according to the first embodiment includes a first substrate 101 in which an optical aperture 102 and a rotating shaft hole 103 are formed, a second substrate 201 in which an aperture 202, a rotating shaft hole 203, and regulating portions 204 and 205 are formed, a first light controlling means 301 in which a first optical aperture regulating portion 302, a coupling groove 303, and a rotating shaft hole 304 are formed, a second light controlling means 401 in which a second optical aperture regulating portion 402, a rotating shaft hole 403, and a protruding portion 404 are formed, a spacer 501 which forms a space for the movement of the first light controlling means 301 and the second light controlling means 401 between the first substrate 101 and the second substrate 201, and a rotating shaft member 601 which is for rotational movement of the first light controlling means 301 and the second light controlling means 401.

The rotating shaft member 601 is formed by a magnet, and is joined to the first light controlling means 301 via the rotating shaft hole 304. Here, a central axis of the rotating shaft member 601 and an axis of rotation AX1 coincide.

Figure 2:
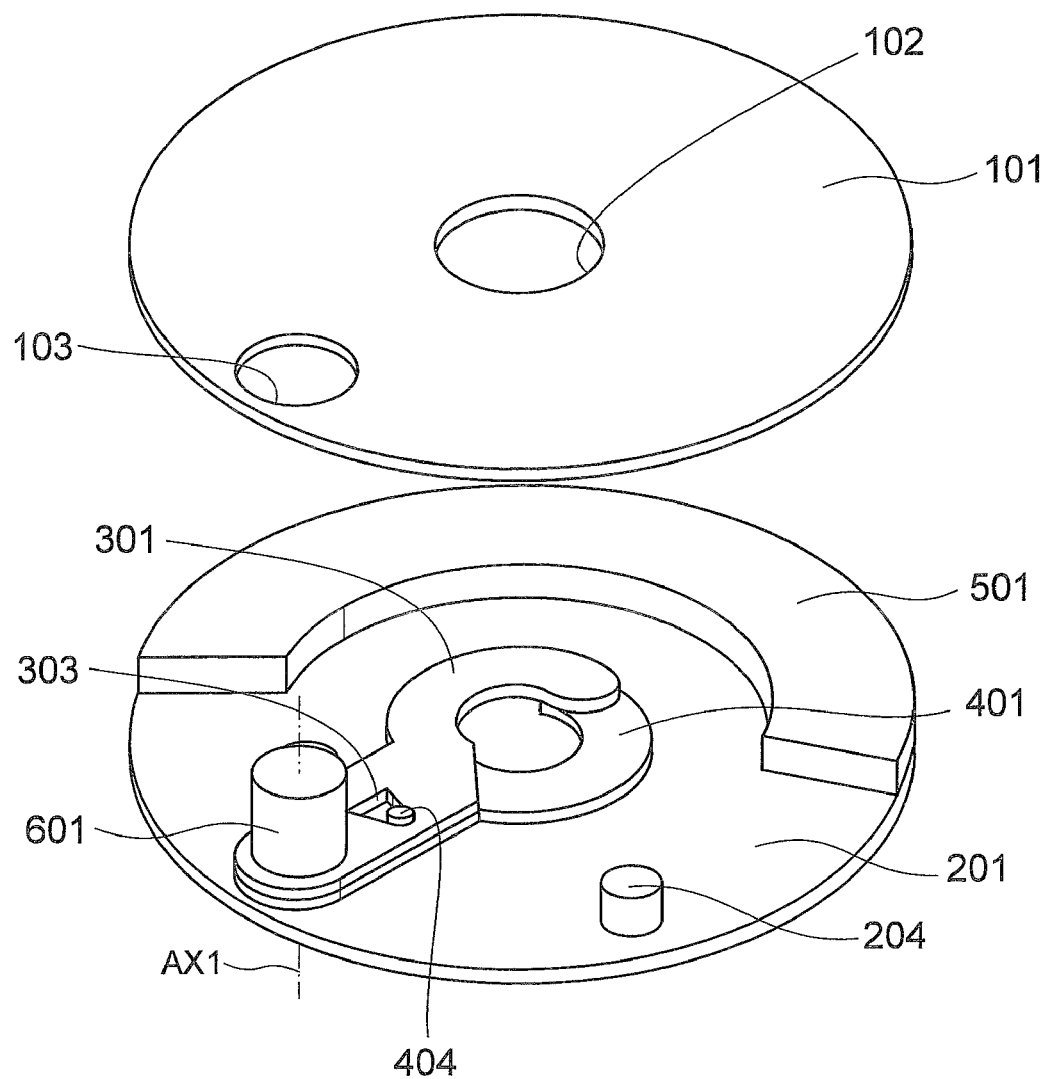
FIG. 2 is an assembly diagram of the first embodiment.

An assembly diagram of the light controlling apparatus according to the first embodiment is shown in FIG. 2. As shown in FIG. 2, the rotating shaft member 601 which is joined to the first light controlling means 301 is inserted into the rotating shaft hole 103 formed in the first substrate 101 and the rotating shaft hole 203 formed in the second substrate 201, and is installed rotatably.

Moreover, the rotating shaft member 601 which is joined to the first light controlling means 301 is inserted into the rotating shaft hole 403 of the second light controlling means 401. The second light controlling means 401 overlaps with the first light controlling means 301 via the rotating shaft member 601, and is installed rotatably.

Here, the second light controlling means 401 is not joined to the rotating shaft member 601, and is coupled with the first light controlling means 301 by engaging the protruding portion 404 into the coupling groove 303 formed in the first light controlling means 301.

Next, an operation of the light controlling apparatus according to the first embodiment will be described below by using FIG. 3 and FIG. 4. Moreover, a top view in which the first substrate 101 is omitted is shown to facilitate the description.

Figure 3:
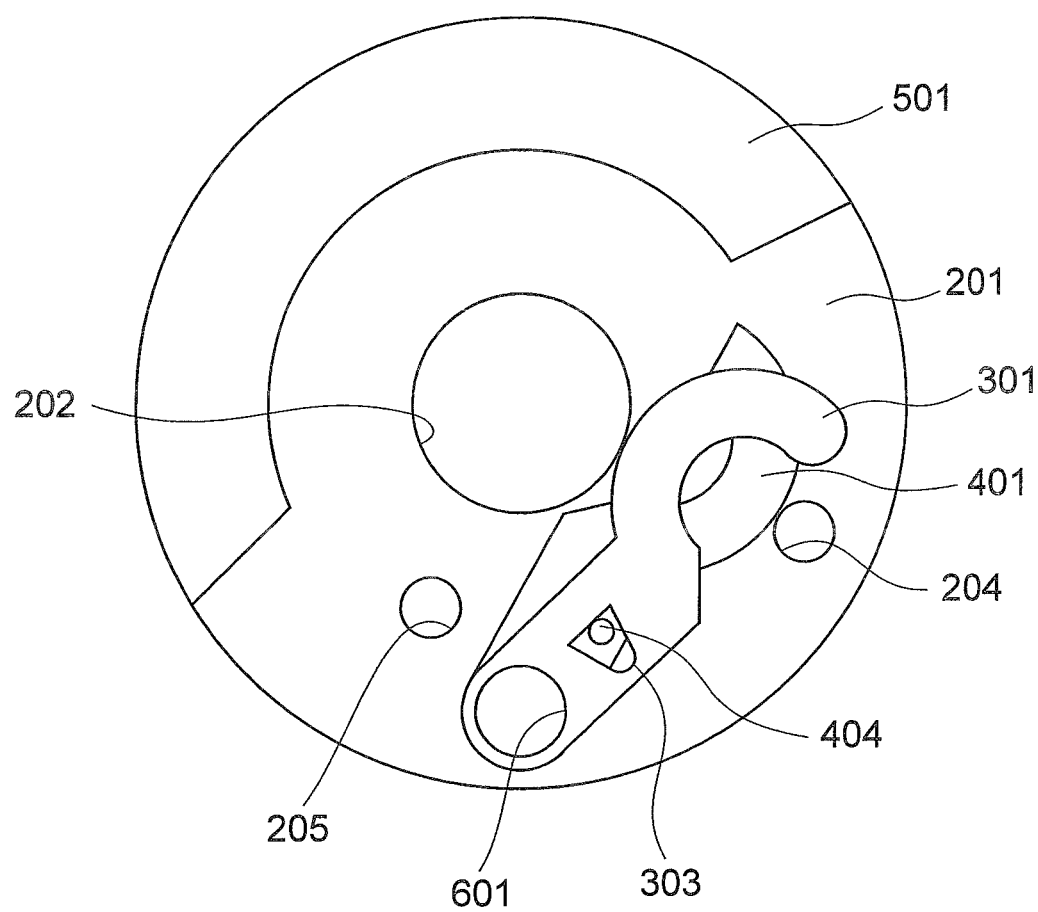
FIG. 3 is a diagram describing a state of a light controlling means of the first embodiment being retracted from an aperture.

FIG. 3 is a diagram when the first light controlling means 301 and the second light controlling means 401 are retracted from the optical aperture 102 formed in the first substrate 101 and the aperture 202 formed in the second substrate 201. For bringing the first light controlling means 301 and the second light controlling means 401 to this state, torque is applied directly to the rotating shaft member 601, and the first light controlling means 301 is moved to rotate in a direction of being retracted from the aperture portion formed in the substrate.

Firstly, the first light controlling means 301 which is joined to the rotating shaft member 601 starts rotating. At the time of start of the rotational movement, the second light controlling means 401 is not moving. Thereafter, the coupling groove 303 formed in the first light controlling means 301 makes a contact with the protruding portion 404 formed on the second light controlling means 401, and the second light controlling means 401 also starts moving.

When the second light controlling means 401 has struck the regulating portion 204, the second light controlling means 401 stops, and at the same time, the first light controlling means 301 also stops. At this time, the optical aperture 102 formed in the first substrate 101 becomes the optical aperture of the light controlling apparatus, and the first light controlling means 301 and the second light controlling means 401 are accommodated in an overlapped state.

Figure 4:
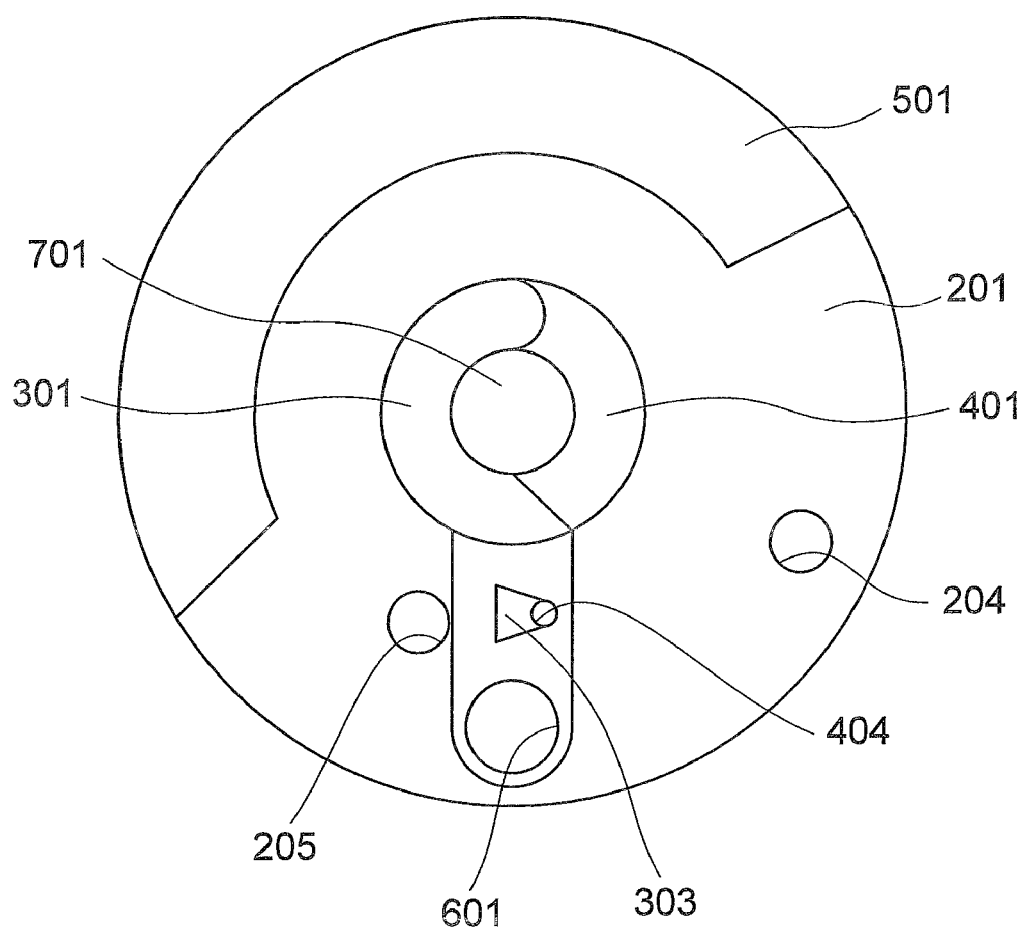
FIG. 4 is a diagram describing a state of the light controlling means of the first embodiment overlapping with the aperture.

FIG. 4 is a diagram when the first light controlling means 301 and the second light controlling means 401 have overlapped with the optical aperture 102 formed in the first substrate 101 and the aperture 202 formed in the second substrate 201. For bringing the first light controlling means 301 and the second light controlling means 401 to this state, torque is applied to the rotating shaft member 601, and the first light controlling means 301 is moved to rotate in a direction of overlapping with the aperture portion formed in the substrate. Firstly, the first light controlling means 301 which is joined to the rotating shaft member 601 starts rotating.

At the time of start of the rotational movement of the first light controlling means 301, the second light controlling means 401 is not moving. Thereafter, the coupling groove 303 formed in the first light controlling means 301 makes a contact with the protruding portion 404 formed on the second light controlling means 401, and the second light controlling means 401 also starts moving. When the second light controlling means 401 has struck the regulating portion 205, the second light controlling means 401 stops, and at the same time, the first light controlling means 301 also stops.

At this time, an optical aperture 701 formed by the optical aperture regulating portions 302 and 402 formed in the first light controlling means 301 and the second light controlling means 401 becomes the optical aperture of the light controlling apparatus.

Figure 5:
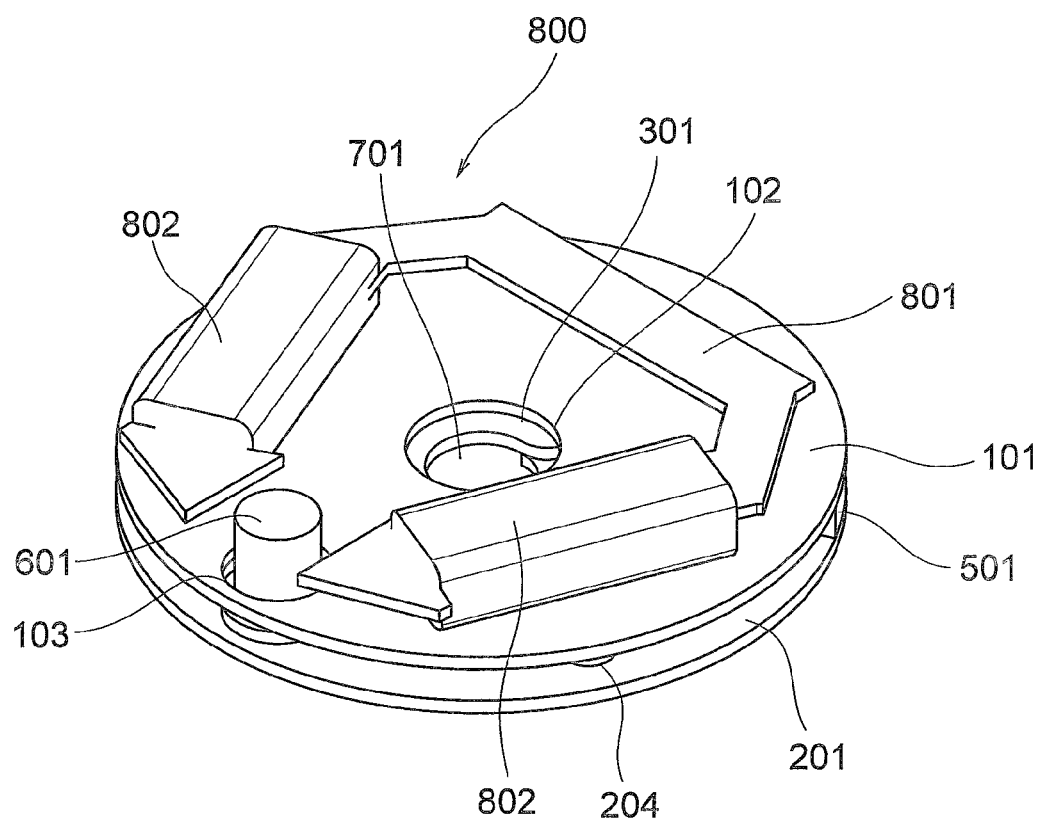
FIG. 5 is an assembly diagram including a drive source of the first embodiment.

In FIG. 5, an assembly diagram of the light controlling apparatus including a drive source 800 is shown.

The drive source 800 is an electromagnetic drive source in which, a winding coil portion 802 is provided to a yoke member 801. The drive source 800 is disposed on the first substrate 101 such that, a front end of the yoke member 801 is facing the rotating shaft member 601. Here, when an electric power is supplied to the winding coil portion 802, it is possible to rotate the rotating shaft member (magnet) 601 by a magnetic force which is generated from the front end of the yoke member 801. Since the rotating shaft member 601 rotates, it is possible to rotate the first light controlling means 301 and the second light controlling means 401.

In a conventional light controlling apparatus, each of the first light controlling means 301 and the second light controlling means 401 required a rotating shaft, and a rotating shaft hole for assembling the rotating shaft. However, in the first embodiment, by letting axes of rotations AX1 and AX2 of the first light controlling means 301 and the second light controlling means 401 respectively to be the same, it is possible to achieve the desired motion only by the rotating shaft member 601. Consequently, it is possible to facilitate the assembly.

Moreover, since a space required for disposing the shaft is saved, it is also possible to simplify the structure, and accordingly, the further small-sizing is possible.

Furthermore, in the conventional technology, two diaphragm blades had been operated by one drive source. For this reason, the drive source was required to have a substantial force equivalent to a static friction force of the two diaphragm blades as an initial driving force. However, in the structure of the first embodiment, at the initial driving of the diaphragm blades, one diaphragm blade is moved first, and thereafter, the other diaphragm blade is moved in conjunction by a coupling portion. Therefore, the driving force necessary at an initial stage of driving the diaphragm blades becomes small. Therefore, it is possible to drive more stably.

Second Embodiment

Next, a light controlling apparatus according to a second embodiment of the present invention will be described below by using diagrams from FIG. 6 to FIG. 11A and FIG. 11B. Firstly, the second embodiment will be explained by using FIG. 6 and FIG. 7. Same reference numerals are assigned to components having same structure as in the first embodiment.

Figure 6:
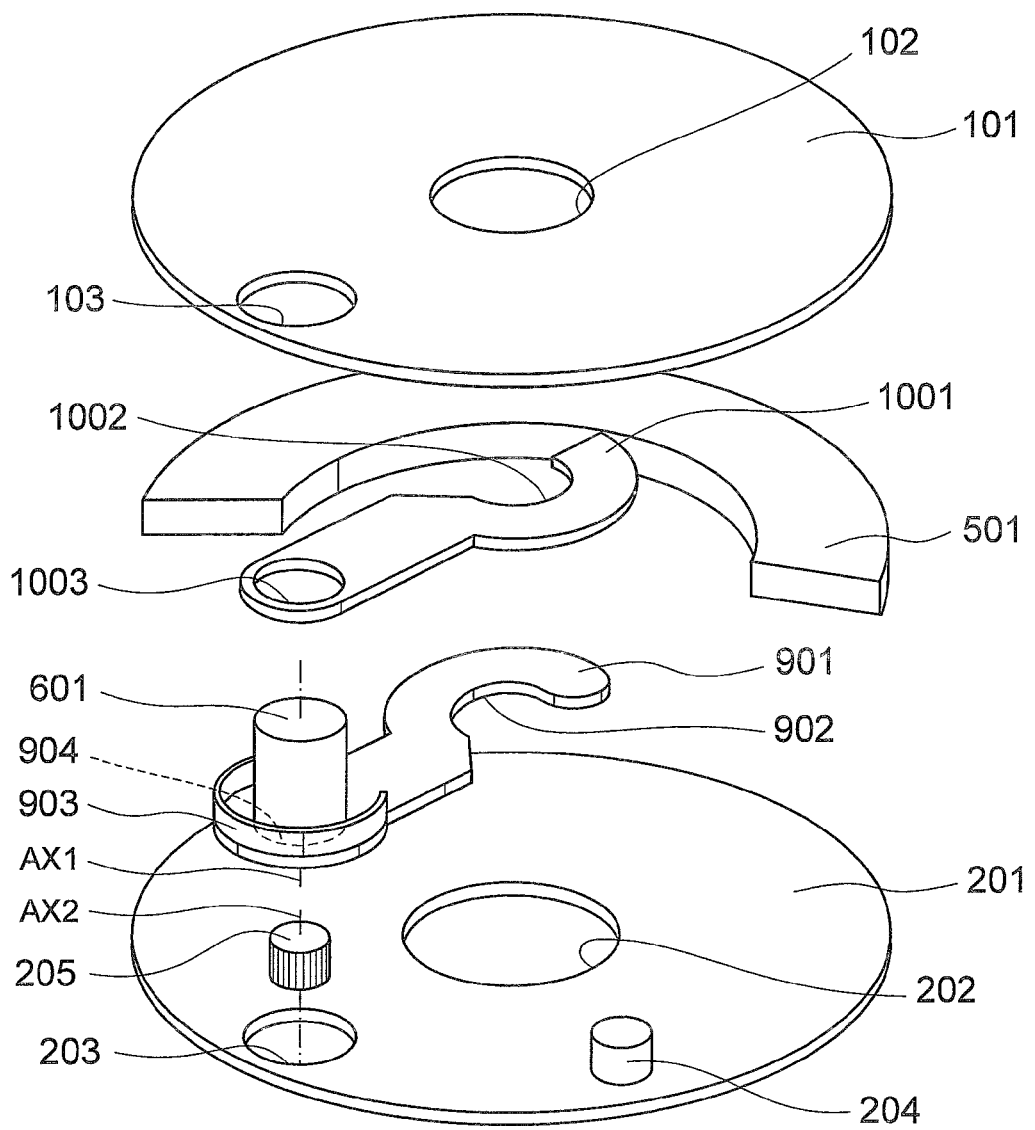
FIG. 6 is a diagram showing a structure of a second embodiment.

As shown in FIG. 6, the light controlling apparatus according to the second embodiment includes the first substrate 101 in which the optical aperture 102 and the rotating shaft hole 103 are formed, a second substrate 201 in which the aperture 202, the rotating shaft hole 203, and the regulating portions 204 and 205 are formed, a first light controlling means 901 in which a first optical aperture regulating portion 902, a protruding portion 903, and a rotating shaft hole 904 are formed, a second light controlling means 1001 in which a second optical aperture regulating portion 1002 and a rotating shaft hole 1003 are formed, the spacer 501 which forms a space for the movement of the first light controlling means 901 and the second light controlling means 1001 between the first substrate 101 and the second substrate 201, and the rotating shaft member 601 which is for rotational movement of the first light controlling means 901 and the second light controlling means 1001.

Moreover, the rotating shaft member 601 is formed by a magnet, and is joined to the first light controlling means via the rotating shaft hole 904. Here, the central axis of the rotating shaft member 601 and the axis of rotation AX1 coincide.

Figure 7:
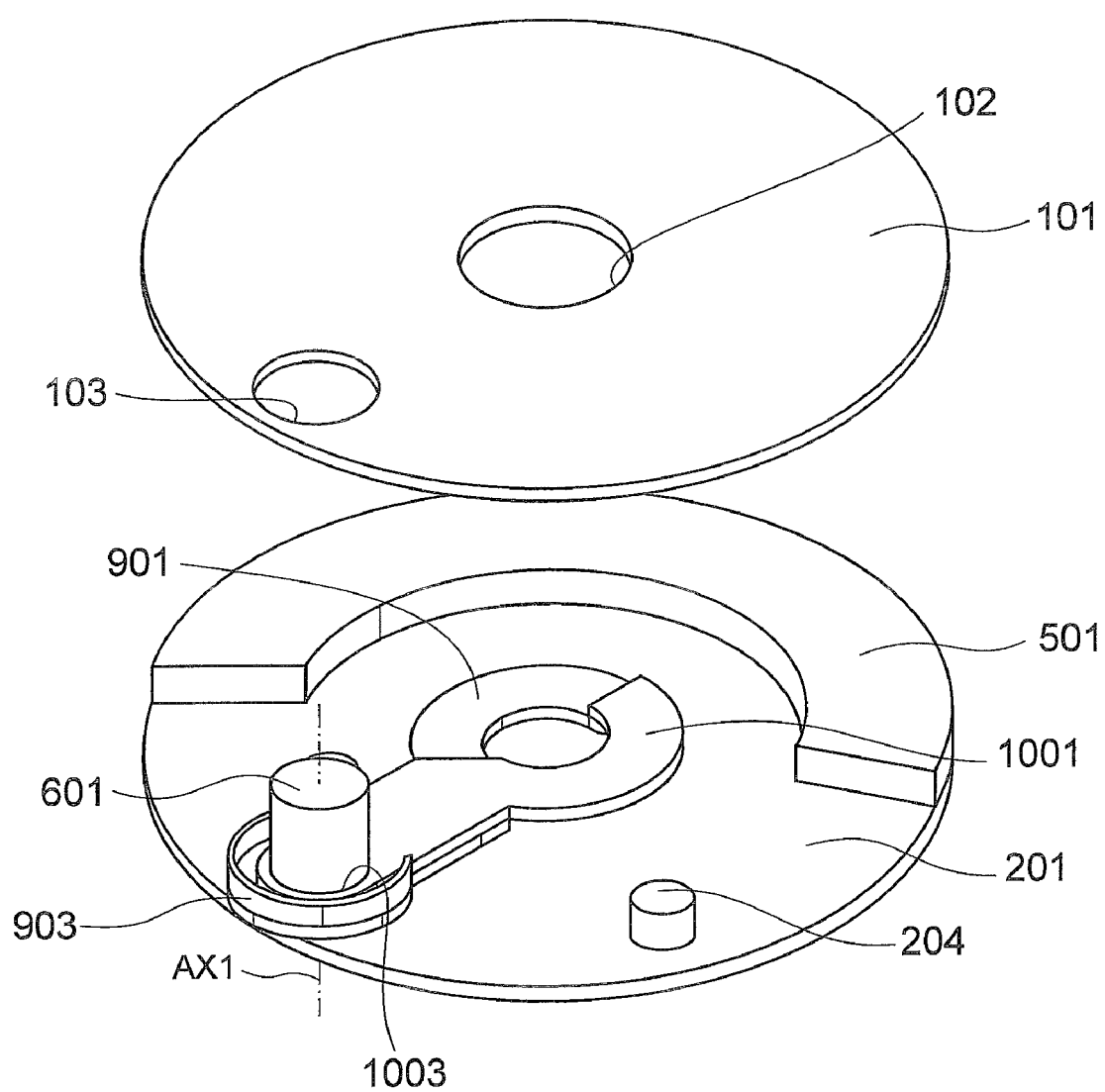
FIG. 7 is an assembly diagram of the second embodiment.

An assembly diagram of the light controlling apparatus according to the second embodiment is shown in FIG. 7. As shown in FIG. 7, the rotating shaft member 601 which is joined to the first light controlling means 901 is inserted through the rotating shaft hole 103 formed in the first substrate 101 (refer to FIG. 1) and the rotating shaft hole 203 formed in the second substrate 201 (refer to FIG. 1), and is installed rotatably.

Moreover, the rotating shaft member 601 which is joined to the first light controlling means 901 is inserted into a rotating shaft hole 1003 of the second light controlling means 1001. The second light controlling means 1001 overlaps with the first light controlling means 901 via the rotating shaft member 601, and is installed rotatably. Here, the second light controlling means 1001 is not joined to the rotating shaft member 601, but is disposed in a notch of the protruding portion 903 formed on the first light controlling means, via the rotating shaft member 601.

Next, an operation of the light controlling apparatus according to the second embodiment will be described below by using FIG. 8 and FIG. 9. Moreover, a top view in which the first substrate 101 is omitted to facilitate the description is shown.

Figure 8:
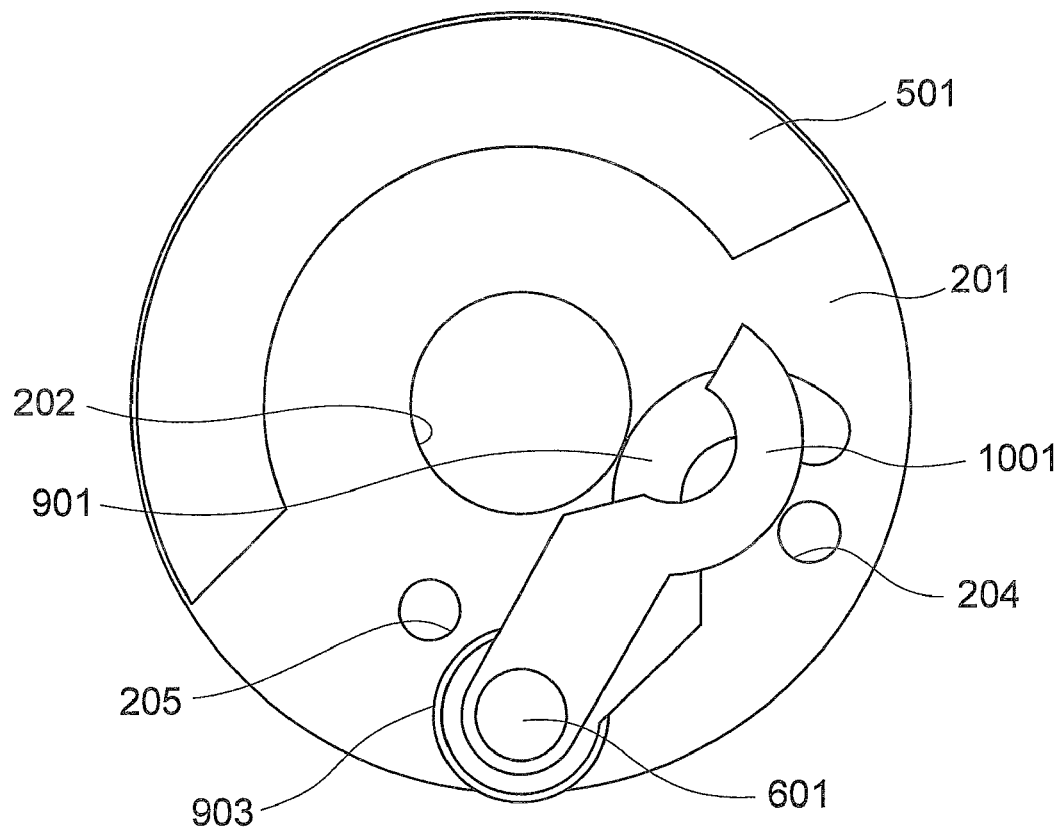
FIG. 8 is a diagram describing a state of a light controlling means of the second embodiment being retracted from an aperture.

FIG. 8 is a diagram when the first light controlling means 901 and the second light controlling means 1001 are retracted from the optical aperture 102 formed in the first substrate 101 and the aperture 202 formed in the second substrate 201. For bringing the first light controlling means 901 and the second light controlling means 1001 to this state, torque is applied to the rotating shaft member 601, and the first light controlling means 901 is moved to rotate in a direction of being retracted from the aperture portion formed in the substrate.

As the torque is applied, firstly, the first light controlling means 901 joined to the rotating shaft member 601 starts rotational movement. At the time of start of the rotational movement, the second light controlling means 1001 is not moving. Thereafter, the projecting portion 903 formed on the first light controlling means 901 makes a contact with the second light controlling means 1001, and the second light controlling means 1001 also starts moving.

When the second light controlling means 1001 has struck the regulating portion 204, the second light controlling means 1001 stops, and at the same time, the first light controlling means 901 also stops.

At this time, the optical aperture 102 formed in the first substrate 101 becomes the optical aperture of the light controlling apparatus, and the first light controlling means 901 and the second light controlling means 1001 are accommodated in an overlapped state.

Figure 9:
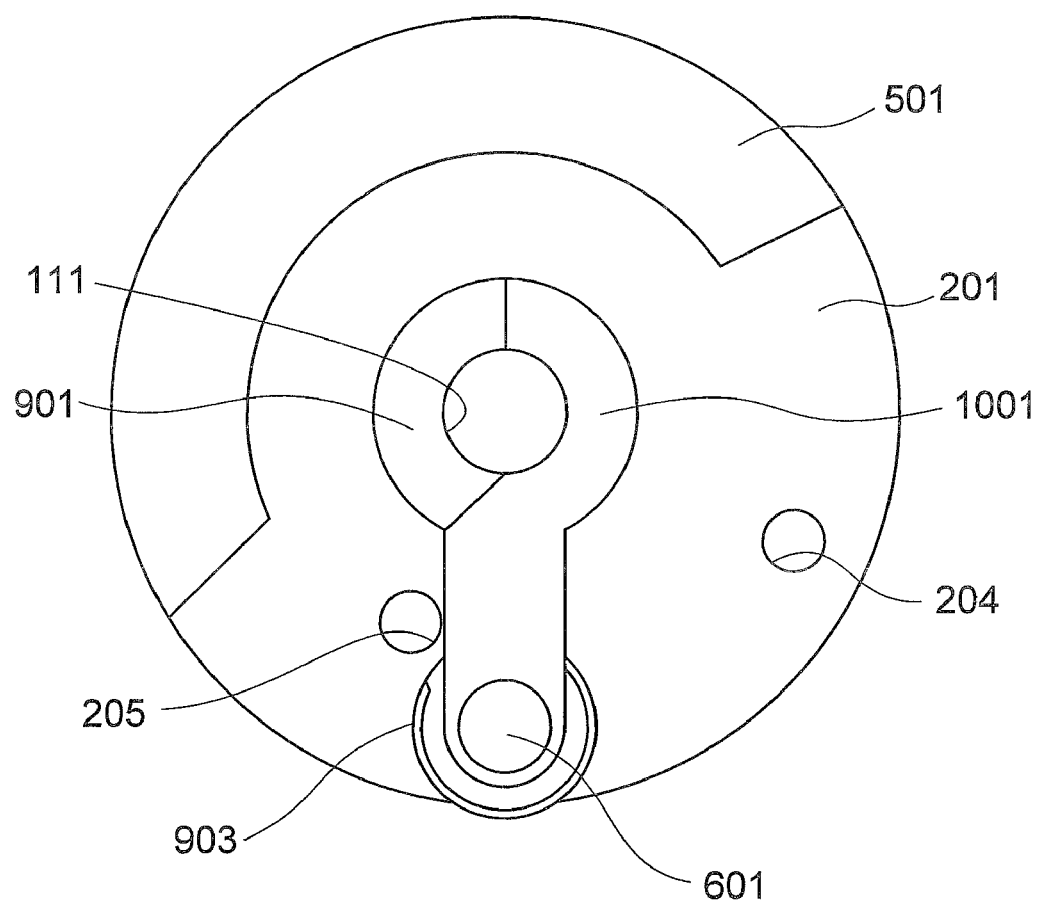
FIG. 9 is a diagram describing a state of the light controlling means of the second embodiment overlapping with the aperture.

FIG. 9 is a diagram when the first light controlling means 901 and the second light controlling means 1001 have overlapped with the optical aperture 102 formed in the first substrate 101 and the aperture 202 formed in the second substrate 201. For bringing the first light controlling means 901 and the second light controlling means 1001 to this state, torque is applied to the rotating shaft member 601, and the first light controlling means 901 is moved to rotate in a direction of overlapping with the aperture portion formed in the substrate.

Accordingly, the first light controlling means 901 which is joined to the rotating shaft member 601 starts rotating. At the time of start of the rotational movement of the first light controlling means 901, the second light controlling means 1001 is not moving. Thereafter, the protrusion 903 formed on the first light controlling means 901 makes a contact with the second light controlling means 1001, and the second light controlling means 1001 also starts moving. When the second light controlling means 1001 has struck the regulating portion 205, the second light controlling means 1001 stops, and at the same time, the first light controlling means 901 also stops.

At this time, an optical aperture 111 formed by the optical aperture regulating portion 902 formed in the first light controlling means 901 and the optical aperture regulating portion 1002 formed in the second light controlling means 1001 become the optical aperture of the light controlling apparatus according to the second invention.

Figure 10:
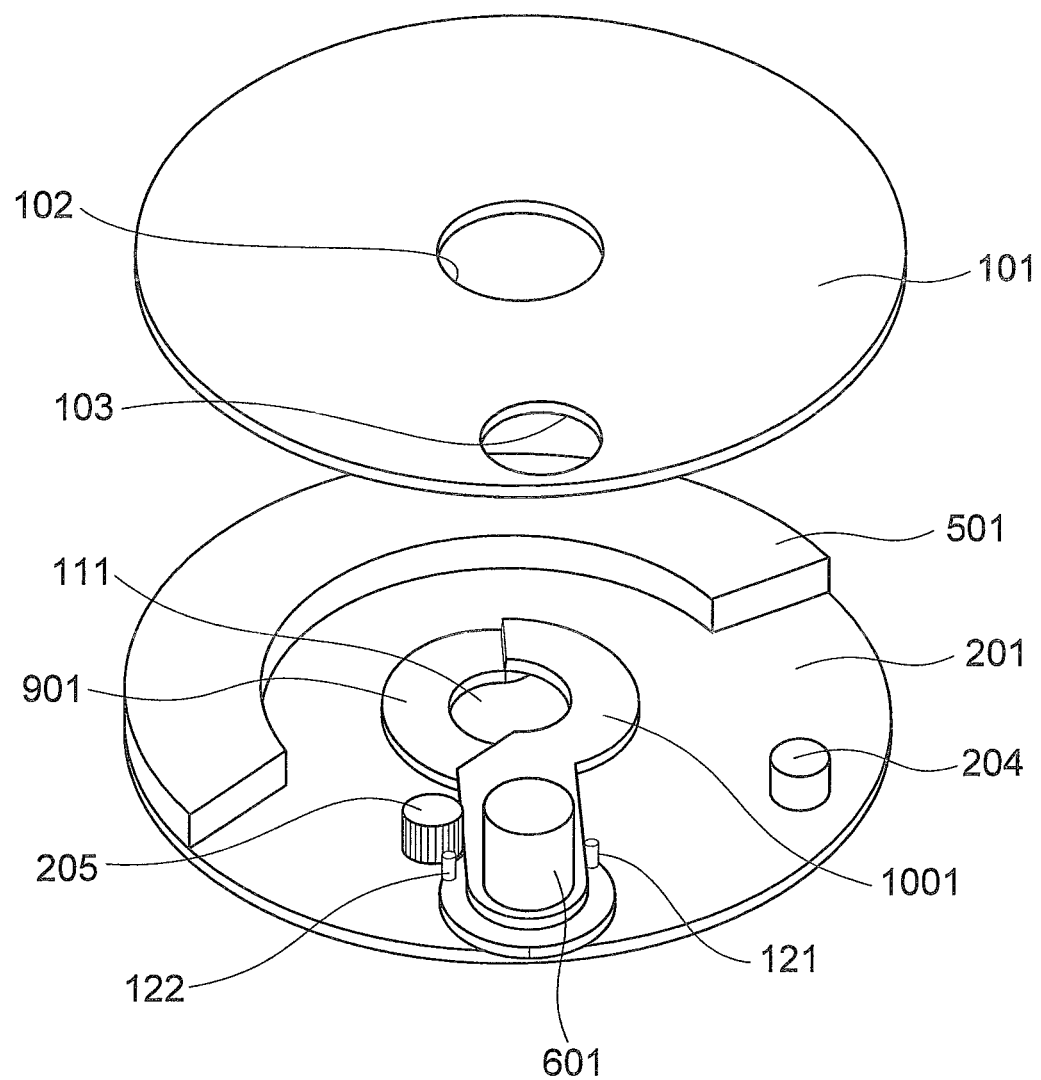
FIG. 10 is a diagram describing a modified embodiment of the second embodiment.
Figure 11A:
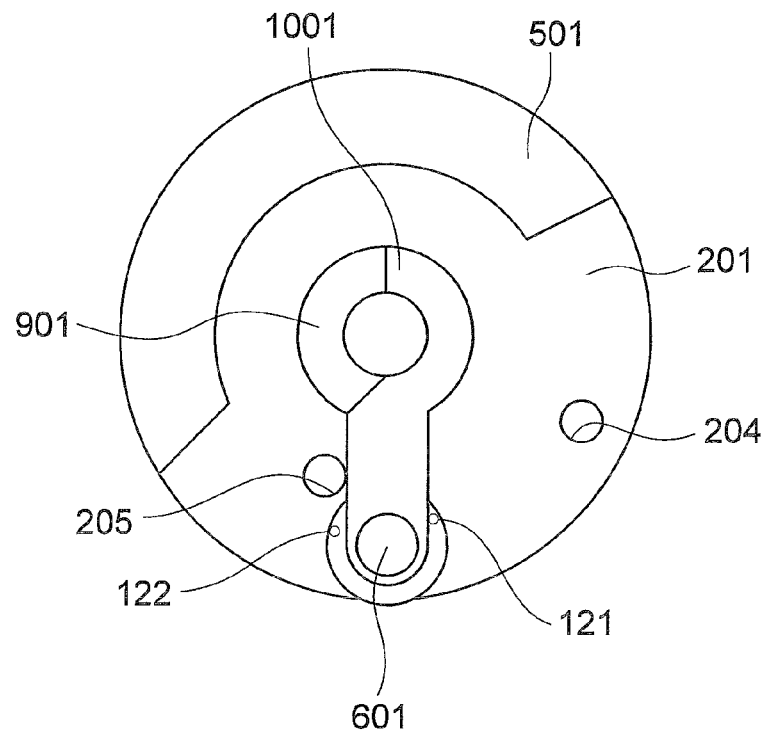
FIG. 11A and FIG. 11B are diagrams describing an operation of the modified embodiment of the second embodiment.
Figure 11B:
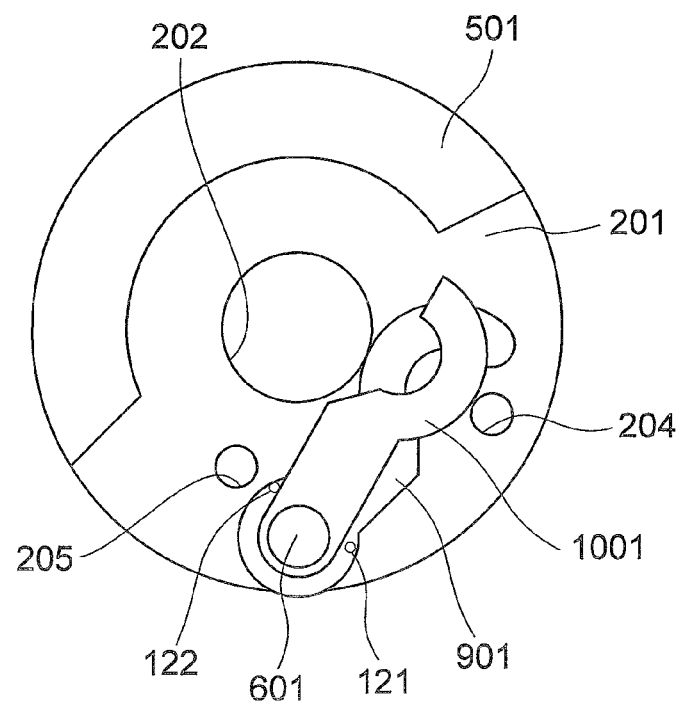

A drive source in the second embodiment being same as the drive source in the first embodiment, the description thereof is omitted. The same effect can be achieved by a structure in which, instead of the protruding portion provided to the first light controlling means 901, protruding portions 121 and 122 as shown in FIG. 10, FIG. 11A, and FIG. 11B are formed. An operation of the structure shown in FIG. 11A and FIG. 11B being same as the operation of the structure of the second embodiment described above, the description thereof is omitted.

Figure 12:
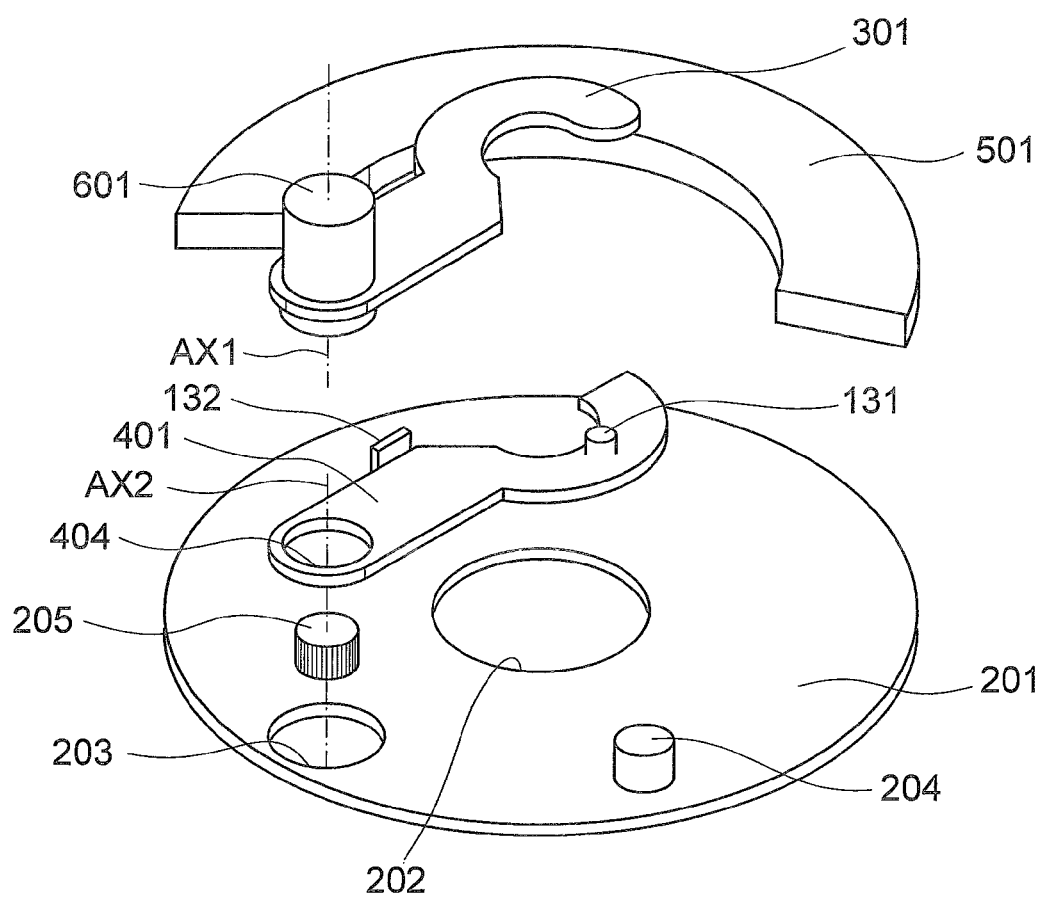
FIG. 12 is a diagram describing a modified embodiment of the second embodiment.

Moreover, in the second embodiment, the protruding portions 121 and 122, and the protruding portion 903 are provided only to the first light controlling means 901 to which the rotating shaft member 601 is joined. However, without restricting to such structure, as shown in FIG. 12, the same effect can be achieved also by modifying the first embodiment by forming protruding portions 131 and 132 only to the second light controlling means 1001 to which the rotating shaft member 601 is not joined. An operation being same as the operation described above, the description thereof is omitted.

According to the present embodiment, it is possible to rotate the first light controlling means 901 and the second light controlling means 1001 with the same axis of rotations AX1 and AX2 similarly as in the first embodiment. Therefore, since one axis of rotation serves the purpose, assemblability improves substantially. Moreover, in the first embodiment, the coupling portions (the protruding portion and the groove) is formed on the first light controlling means 301 and the second light controlling means 401 respectively, and the first light controlling means 301 and the second light controlling means 401 are coupled. Whereas, in the second embodiment, by providing the coupling portion (the protruding portion) only to the first light controlling means 901, it is possible to move in conjunction the other light controlling means. Consequently, it is possible to simplify further the structure.

As it has been described above, the light controlling apparatus according to the present invention is useful for a small-size optical apparatus, and particularly, is appropriate for a light controlling apparatus in which further small-sizing is sought.

The light controlling apparatus according to the present invention has an arrangement for rotating the two diaphragm blades with the same axis of rotation. Moreover, only one diaphragm blade is joined to the rotating shaft member. The structure is let to be such that two diaphragm blades have a coupling portion which couples the two diaphragm blades, and when the diaphragm blade which is joined to the rotating shaft member is rotated, the other diaphragm blade also moves in conjunction, and is rotated.

Since the axis of rotation for the two diaphragm blades is the same, it is possible to simplify the structure, and to improve the assemblability. As a result, there is a possibility of further small-sizing.

In this manner, the present invention shows an effect that it is possible to simplify the structure, to improve the assemblability, and to make the size further smaller.

What is claimed is:

1. A light controlling apparatus comprising:
   a substrate in which an optical aperture is formed;
   a first light controlling means and a second light controlling means, each having an optical aperture regulating portion; and
   a drive source which moves the first light controlling means and the second light controlling means, wherein
   the first light controlling means and the second light controlling means move mutually to a first stationary position retracted from a position of the optical aperture, and a second stationary position which overlaps with a position of the optical aperture, and
   a single rotating shaft member is formed integrally with the first light controlling means, and
   a coupling portion is formed on at least one of the first light controlling means and the second light controlling means, and the first light controlling means is rotated by rotating the single rotating shaft member by the drive source, a rotational movement of the first light controlling means is transmitted to the second light controlling means by contacting mechanically the first light controlling means and the second light controlling means via the coupling portion, and the second light controlling means is also rotated turned in conjunction by the coupling portion, and
   the first light controlling means and the second light controlling means rotate with the same axis of rotation as a center of rotation.

2. The light controlling apparatus according to claim 1, wherein a central axis of the rotating shaft member and the axis of rotation of the first controlling means and the second controlling means coincide.

3. The light controlling apparatus according to claim 1, wherein
   at least one of the first light controlling means and the second light controlling means has a protruding portion which is protruded in an optical axial direction, and
   the first light controlling means and the second light controlling means are coupled by the protruding portion, and move in conjunction.

4. The light controlling apparatus according to claim 2, wherein
   at least one of the first light controlling means and the second light controlling means has a protruding portion which is protruded in an optical axial direction, and
   the first light controlling means and the second light controlling means are coupled by the protruding portion, and move in conjunction.

5. The light controlling apparatus according to claim 3, wherein
   a groove is formed in one of the first light controlling means and the second light controlling means, and a protruding portion which is protruded in the optical axial direction is formed in one of the first light controlling means and the second light controlling means in which the groove is not formed, and
   the first light controlling means and the second light controlling means are coupled by the groove and the protruding portion.

6. The light controlling apparatus according to claim 4, wherein
   a groove is formed in one of the first light controlling means and the second light controlling means, and a protruding portion which is protruded in the optical axial direction is formed in one of the first light controlling means and the second light controlling means in which the groove is not formed, and
   the first light controlling means and the second light controlling means are coupled and operated by the groove and the protruding portion.

7. The light controlling apparatus according to claim 1, wherein the first light controlling means and the second light controlling means are accommodated in an overlapped state at the first stationary position, and an optical aperture is formed by the optical aperture regulating portion at the second stationary position.

8. The light controlling apparatus according to claim 1, wherein
   the rotating shaft member is formed by a circular cylindrical shaped magnet, and
   the drive source is an electromagnetic drive source which includes a yoke and a winding coil, and
   the circular cylindrical shaped magnet is rotated by the electromagnetic drive source.

9. A light controlling apparatus comprising:
   a substrate in which an optical aperture is formed;

a first light controlling means and a second light controlling means, each having an optical aperture regulating portion; and a drive source which moves the first light controlling means and the second light controlling means, wherein the first light controlling means and the second light controlling means move mutually to a first stationary position retracted from a position of the optical aperture, and a second stationary position which overlaps with a position of the optical aperture, and a single rotating shaft member is formed integrally with the first light controlling means, and a coupling portion is formed on at least one of the first light controlling means and the second light controlling means, and the first light controlling means is rotated by rotating the single rotating shaft member by the drive source, and the second light controlling means is also rotated turned in conjunction by the coupling portion, and the first light controlling means and the second light controlling means rotate with the same axis of rotation as a center of rotation.

* * * * *